(12) United States Patent
O'Brien (10) Patent No.: US 6,775,839 B1
(45) Date of Patent: Aug. 10, 2004

(54) OPTICAL STORAGE DEVICE WITH PRINT LAYER SURFACE FEATURE

(76) Inventor: Patrick J. O'Brien, 17 Brave Boat Harbor Rd., York, ME (US) 03909

( * ) Notice: Subject to any disclaimer, the term of this patent is extended or adjusted under 35 U.S.C. 154(b) by 305 days.

(21) Appl. No.: 10/099,112

(22) Filed: Mar. 15, 2002

(51) Int. Cl.[7] .................................................. G11B 7/24
(52) U.S. Cl. ......................................................... 720/718
(58) Field of Search ................................. 369/286, 287, 369/291, 275.1, 275.2, 124.07; 340/572.1; 720/718, 745

(56) References Cited

U.S. PATENT DOCUMENTS

| | | | |
|---|---|---|---|
| 4,215,342 A | 7/1980 | Horowitz | |
| 4,321,586 A | 3/1982 | Cooper et al. | |
| 4,510,489 A | 4/1985 | Anderson, III et al. | |
| 4,512,848 A | 4/1985 | Deckman et al. | |
| 4,967,185 A | 10/1990 | Montean | |
| 5,012,380 A | 4/1991 | Harissis et al. | |
| 5,013,632 A | 5/1991 | Weber | |
| 5,071,597 A | 12/1991 | D'Amato et al. | |
| 5,081,446 A | 1/1992 | Gill et al. | |
| 5,128,779 A | 7/1992 | Mallik | |
| 5,279,689 A | 1/1994 | Shvartsman | |
| 5,347,508 A | 9/1994 | Montbriand et al. | |
| 5,357,240 A | 10/1994 | Sanford et al. | |
| 5,411,296 A * | 5/1995 | Mallik | 283/86 |
| 5,469,140 A | 11/1995 | Liu et al. | |
| 5,575,878 A | 11/1996 | Cox et al. | |
| 5,608,379 A | 3/1997 | Narlow et al. | |
| 5,643,678 A | 7/1997 | Boswell | |
| 5,776,574 A | 7/1998 | Honguh et al. | |
| 5,805,563 A * | 9/1998 | Nakano | 369/275.1 |
| 5,811,217 A | 9/1998 | Akahira et al. | |
| 5,858,498 A | 1/1999 | Ohkubo et al. | |
| 5,871,881 A | 2/1999 | Nishida et al. | |
| 5,940,362 A | 8/1999 | Plonsky et al. | |
| 6,007,889 A | 12/1999 | Nee | |
| 6,027,595 A | 2/2000 | Suleski | |
| 6,030,677 A | 2/2000 | Ro et al. | |
| 6,177,168 B1 | 1/2001 | Stevens | |
| 6,262,663 B1 | 7/2001 | Altwasset et al. | |
| 6,329,987 B1 | 12/2001 | Gottfried et al. | |
| 6,343,062 B1 | 1/2002 | Furukawa et al. | |
| 6,618,347 B1 * | 9/2003 | Gotoh et al. | 369/124.07 |

* cited by examiner

Primary Examiner—Allen Cao
(74) Attorney, Agent, or Firm—Banner & Witcoff, LTD (57) ABSTRACT

An optical storage medium having an optically-transparent flexible substrate, a reflective layer bonded to the substrate surface, and a print layer bonded to the reflective layer, where the print layer also includes a modified print layer region such as a lenticular region, a diffractive optical element, an embossed region, a holographic image, a magnetostrictive ferromagnetic material electronic article surveillance tag, or a radio-frequency surveillance tag. The layers are individually formed and laminated together, the laminated combination subsequently cut into a plurality of discs.

20 Claims, 9 Drawing Sheets

OPTICAL STORAGE DEVICE WITH PRINT LAYER SURFACE FEATURE

FIELD OF THE INVENTION

This invention relates to optical storage devices and, in particular, to an optical storage device having a surface feature in a print layer.

BACKGROUND OF THE INVENTION

Optical storage devices are known in the relevant art. Common formats are the compact disc (CD) and the digital versatile disc (DVD) having optically-readable data pits in a rigid substrate. As these digital discs continue to proliferate in the marketplace, manufacturers seek to make their products distinctive from competitors' products by adding text and artwork on the non-data surface.

Special optical effects, such as action images and holographic features, may be incorporated on the digital disc but require costly manufacturing steps. Also, digital discs are typically produced singly from an injection molding press, which keeps the manufacturing cost relatively high.

In addition, there is a problem with theft of popular digital discs. For example, U.S. Pat. No. 5,347,508 "Optical information storage disc for use with electronic article surveillance systems" issued to Montibrand et al., discloses an optical information storage disc adapted for use with an electronic article surveillance system. U.S. Pat. No. 5,012,380 "Article surveillance protection of flexible magnetic computer data storage discs" issued to Harissis et al., discloses a magnetic data storage disc with a ferromagnetic surveillance ring-shaped marker integrally bonded to the disc substrate around the central aperture. While such anti-theft devices provide some degree of protection from theft, the need for additional manufacturing steps and special molds significantly add to the cost of the digital discs.

However, the present state of the art does not provide for the ability to inexpensively fabricate optical storage devices having special optical effects and anti-theft features.

Thus, there is a particular need for a system and method for an improved method of fabricating optical storage devices.

It is therefore an object of the present invention to provide a system and method for providing inexpensive and unique optical storage devices.

BRIEF SUMMARY OF THE INVENTION

The present invention provides for an optical storage medium fabricated from an optically-transparent flexible substrate providing a data layer, a reflective layer, and a print layer which includes a modified print layer region such as a lenticular region, a diffractive optical element, an embossed region, a holographic image, a radio-frequency article surveillance tag, or a magnetostrictive ferromagnetic material electronic article surveillance tag. The layers are individually formed and laminated or bonded together to form a laminated combination film which can be cut into a plurality of discs.

BRIEF DESCRIPTION OF THE DRAWINGS

The invention description below refers to the accompanying drawings, of which.

DETAILED DESCRIPTION OF THE INVENTION

Figure 1:
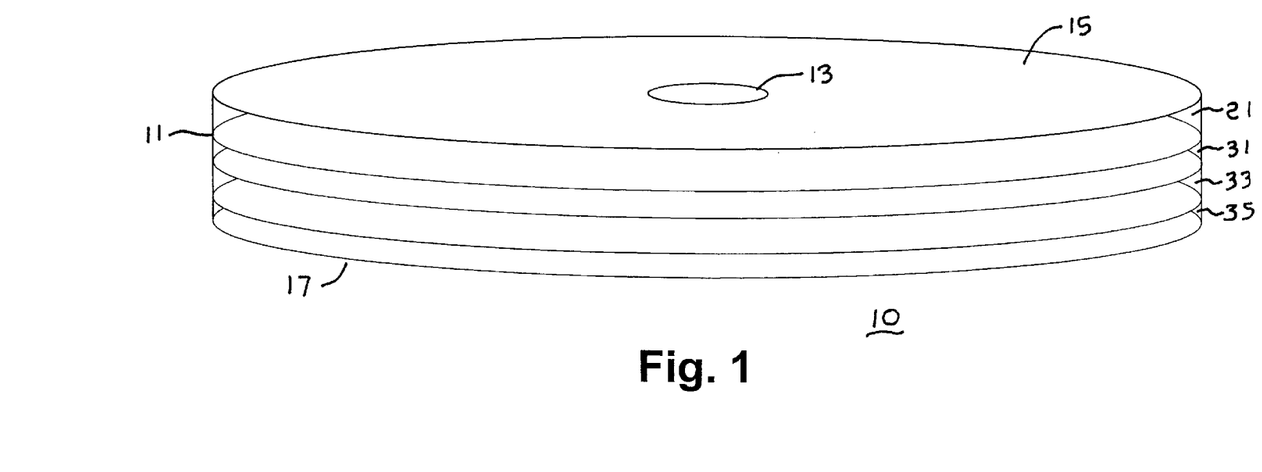
FIG. 1 is a diagrammatical perspective view of an optical storage device in accordance with the present invention.

There is shown in FIG. 1 diagrammatical perspective view (not to scale) of an optical storage device 10 in accordance with the present invention. In a preferred embodiment, the optical storage device 10 is configured as a substantially planar disc having an outer edge 11 and an inner opening 13, both the outer edge 11 and the inner opening 13 generally conforming to the corresponding physical dimensions of, for example, conventional compact disc (CD) or digital versatile disc (DVD) formats. Textual or graphic information related to the disc contents or identification may be imprinted on an upper surface 15. When the optical storage device 10 is configured as a CD-ROM or as a pre-recorded disc, for example, stored data can be read at a lower surface 17.

Figure 2:
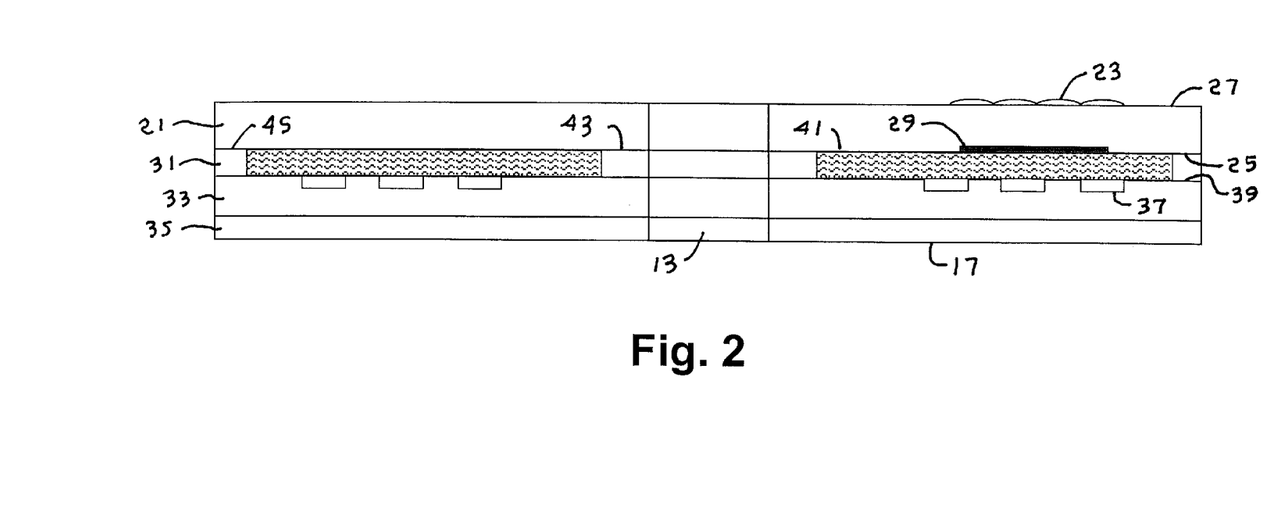
FIG. 2 is a cross sectional view of a first embodiment of the optical storage device of FIG. 1 including a lenticular region.

The optical storage device 10 includes a print layer 21, a reflective layer 31, a data layer provided by an optically-transparent flexible substrate 33, and may include an optional protective layer 35, as can be seen with additional reference to the cross-sectional view of the optical storage device 10 in FIG. 2. The flexible substrate 33 may be formed from polycarbonate resin sheet or film ranging in thickness from approximately 0.012 to approximately 0.016 inch. The reflective layer 31 may be formed from a metallized film, such as aluminum, approximately 300 Angstroms in thickness. The optional protective layer 35 may be formed from polycarbonate film or acrylic resin applied to an approximate thickness of five to ten micrometers. It should be understood that the layer thicknesses shown in the Figures have been exaggerated for clarity of illustration.

The print layer 21 includes a first surface 25 adjacent the reflective layer 31 and a second surface 27 forming the upper surface 15 of the optical storage medium 10. In a first preferred embodiment, the second surface 27 includes a modified print layer region, here configured as a lenticular region 23 formed so as to provide a three-dimensional or action view of an image 29, for example, on the first surface 25. Use of lenticular features to create three-dimensional and action effects are known, as exemplified by the description of the prior art provided in, for example, U.S. Pat. No. 6,329,987 "Lenticular image and method," issued to Gottfried et al. As can be appreciated by one skilled in the relevant art, the optical properties and geometry of the lenticular region 23 can be determined as a function of the thickness and optical properties of the print layer 21, and of the particular three-dimensional or action effect desired. One or more lenticular regions 23 may cover some or all of the second surface 27, as desired for a particular application or effect. Preferably, the one or more lenticular regions 23 are formed and located on the second surface 27 without altering the center of mass of the optical storage device 10 such that rotational motion is not adversely affected during a reading or writing operation with the optical storage device 10.

The reflective layer 31 includes a metallized region 41 used in the reading of data in the flexible substrate 33. In a preferred embodiment, the reflective layer 31 also includes an inner optically-transparent region 43 corresponding to the approximately 15 mm of blank radial space at the center of a conventional compact disc and an outer optically-transparent region 45 corresponding to the approximately 4 mm of blank radial space at the periphery of a conventional compact disc.

The flexible substrate 33 comprises an optically-transparent material so as to enable digital data 37 to be written to and/or read from the lower surface 17 by using a source of coherent optical radiation, such as provided by an optical laser device (not shown). The digital data 37 typically includes a series of data pits on a substrate data surface 39 as is well-known in the relevant art.

Figure 3:
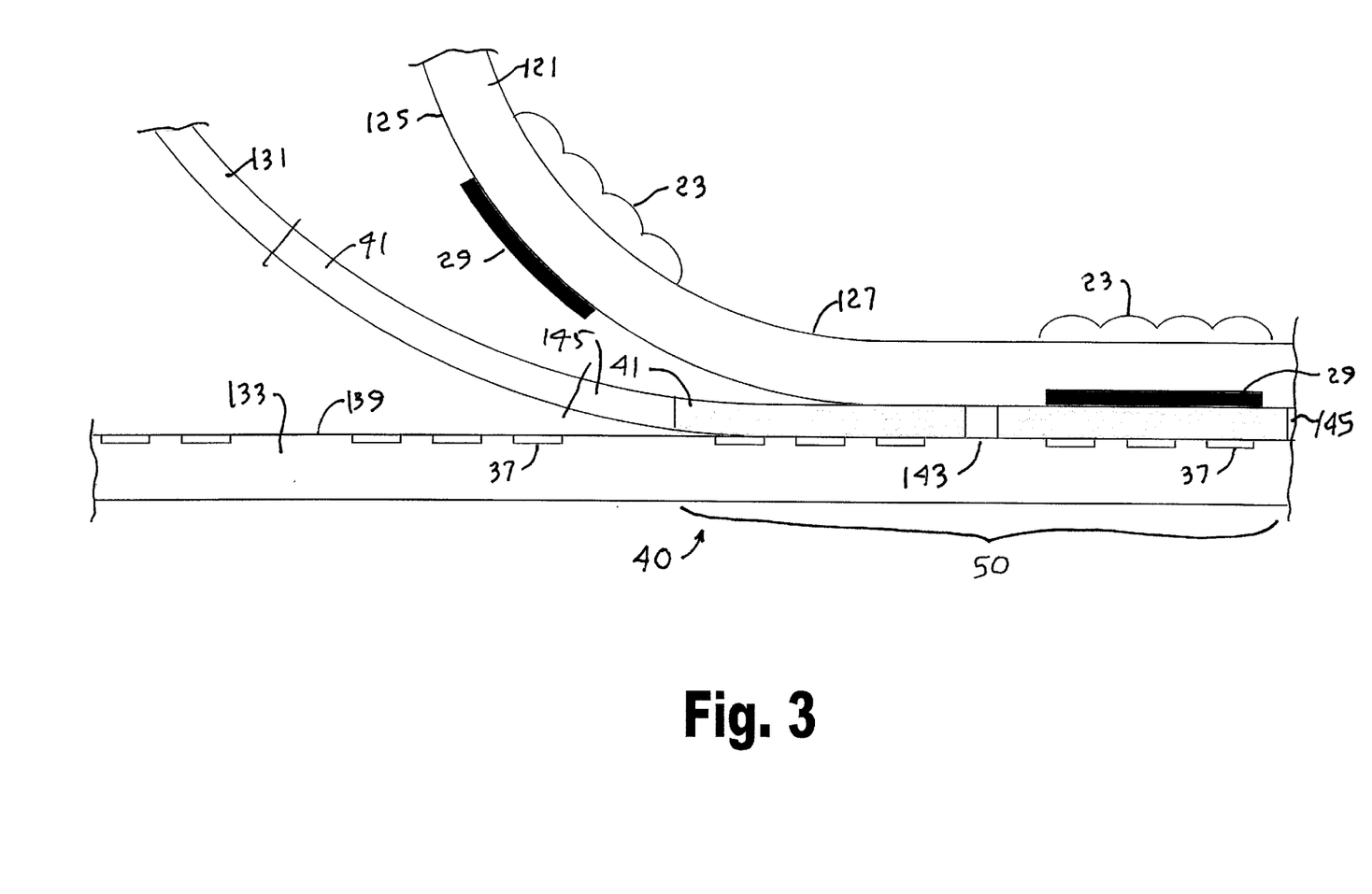
FIG. 3 shows a method of forming and laminating the layers of the optical storage device of FIG. 2.

The optical storage device 10 is preferably fabricated by a method best described with reference to FIG. 3. In fabrication, a print layer film 121, a reflective layer film 131, and a flexible substrate film 133 are produced using a web process known in the relevant art. The print layer film 121, the reflective layer film 131, and the flexible substrate film 133 are laminated or bonded together, by any one of a number of known methods to form a laminated combination film 40.

When fabricated (i.e., prior to bonding), the print layer film 121 includes a plurality of lenticular regions 23 on a second print film surface 127. The lenticular regions 23 can be formed on the second print film surface 127 as shown, or etched into the second print film surface 127 (not shown), or formed and then attached to the second print film surface 127 (not shown). The lenticular regions 23 are positioned at specified locations on the second print film surface 127 such that, when the individual optical storage devices 10 are cut from the laminated combination film 40, as described below, each lenticular region 23 is precisely positioned on a respective optical storage device 10 in accordance with the configuration shown in FIG. 2. Additionally, the print layer film 121 includes a plurality of images 29 on a first print film surface 125, each image 29 corresponding to a lenticular region 23. The images 29 are preferably printed on the first print film surface 125 but can be formed on the first print surface by other methods known in the relevant art. The opposed spatial relationship of the lenticular regions 23 and the images 29 on the print layer film 121 is the same as the relative locations of the lenticular region 23 and the image 29 in the print layer 21 of the optical storage medium 10 as shown in FIG. 2.

The reflective layer film 131 includes a plurality of metallized regions 41 separated by optically-transparent regions 143 and 145. The optically-transparent region 143 corresponds to the inner region 43 of the reflective layer 31 in the optical storage medium 10, and the optically-transparent region 145 corresponds to the outer optically-transparent region 45 of the reflective layer 31 in the optical storage medium 10. The regions 143 and 145 are sized and positioned so as to provide the blank radial spaces at the center and periphery of the optical storage device 10 when configured as a conventional compact disc. The reflective layer film 131 is indexed and aligned with the print layer film 121 prior to bonding so that the opposed spatial relationship of the metallized region 41 with the image 29 in the print layer film 121, for example, is the same as the relative location of the metallized region 41 and the image 29 in the optical storage device 10 as shown in FIG. 2.

The flexible substrate film 131 includes a plurality of digital data 37 formed in a substrate data film surface 139 by an embossing process or stamping method as known in the relevant art. The flexible substrate film 131 is indexed and aligned with the reflective layer film 131 prior to bonding so that the opposed spatial relationship of the metallized region 41 with the digital data 37 in the flexible substrate film 131 is the same as the relative location of the metallized region 41 and the digital data 37 in the optical storage device 10 as shown in FIG. 2.

Figure 4:
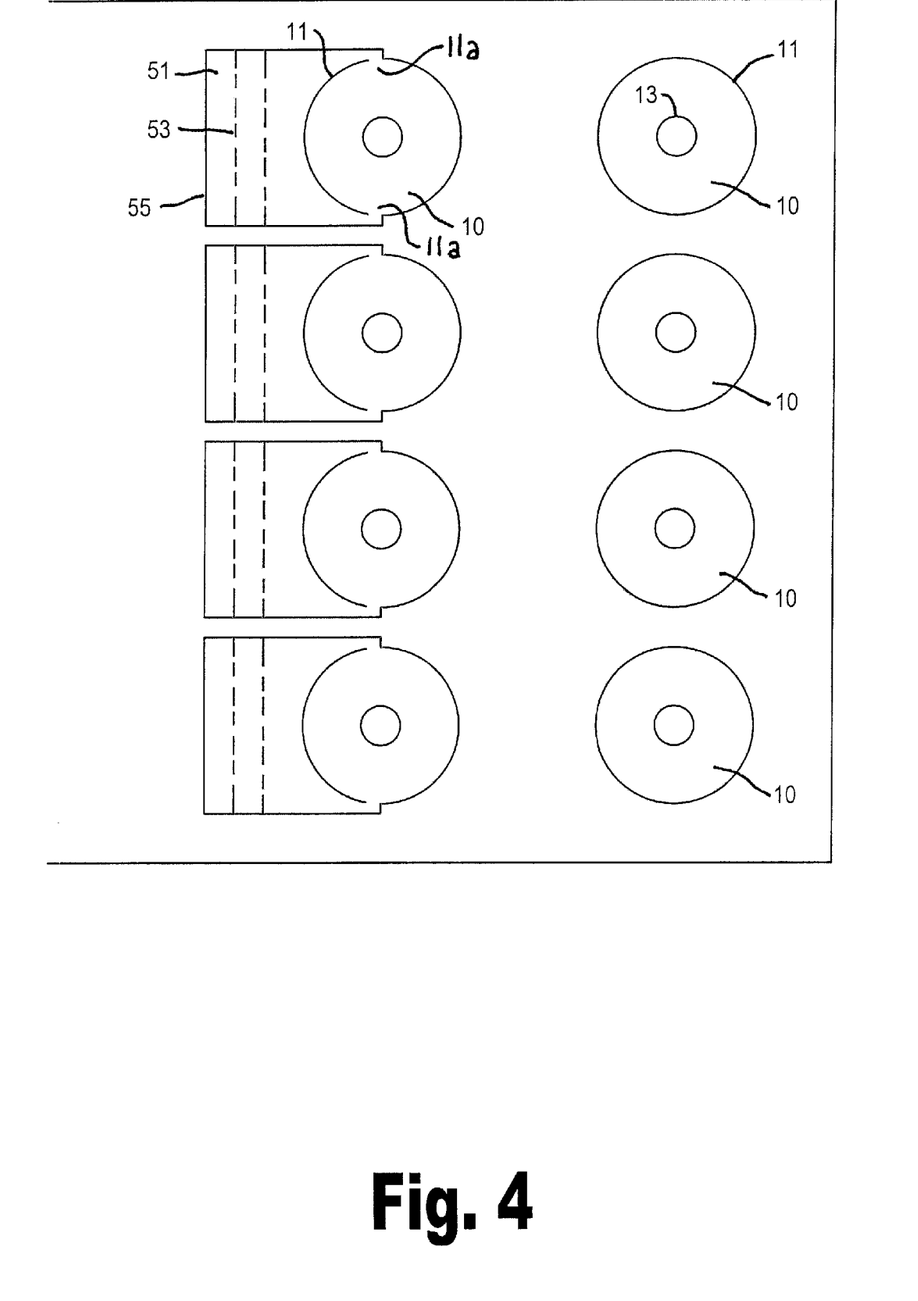
FIG. 4 shows a method of die cutting a plurality of optical storage devices from the laminated layers of FIG. 3.

The optical storage device 10 is produced from a laminated portion 50 of the laminated film 40 by a subsequent die cutting, stamping, or shearing operation. FIG. 4 provides a view of the planar extent of the laminated combination film 40, upon which is shown a row of four optical storage devices 10 extending along the width of the laminated film 40. It should be understood that the disclosed method is not limited to a configuration of four optical storage devices 10 per row and more or fewer devices per row can be produced, depending upon the width of the laminated combination film 40 produced. Each optical storage device 10 is separated from the laminated film 40 by an appropriate cutting operation at the outer edge 11 and the inner opening 13. In an alternative embodiment, the optical storage device 10 may be formed from the laminated film 40 with a removably attached panel 51.

This configuration can be fabricated by separating the panel 51 from the laminated combination film 40 along a perimeter 55 and by leaving one or more small uncut portions 11a along the outer edge 11 as shown. The panel 51 can be used to secure the optical storage device 10 in a magazine or other periodical (not shown) as an insert, with one or more optional score lines 53 provided in the panel 51 to provide additional flexibility in the publication binding process or if the magazine is rolled up or folded. A reader of the magazine can then remove the optical storage device 10 by physically separating the optical storage device 10 from the panel 51 at the small uncut portions 11*a*.

Figure 5:
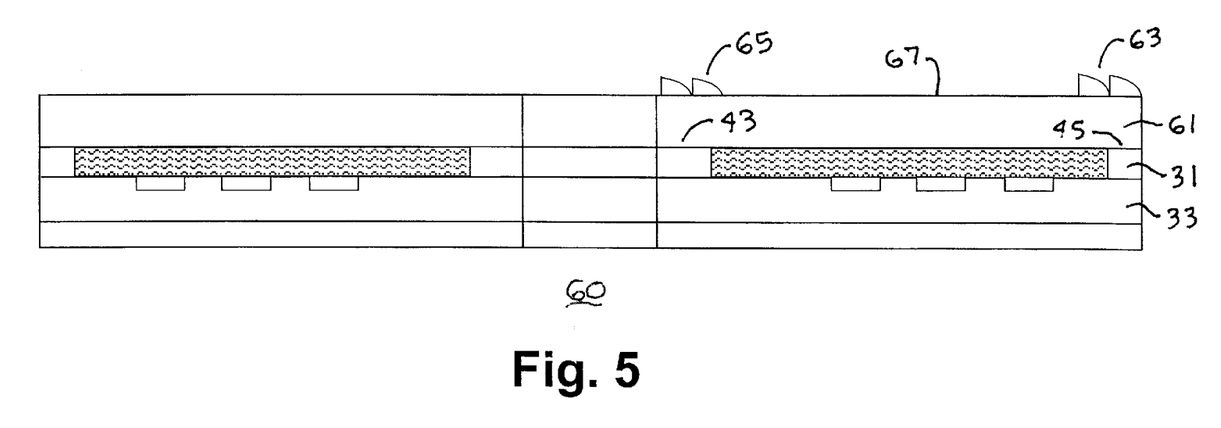
FIG. 5 is a cross-sectional view of a second embodiment of the optical storage device of FIG. 1 including a diffractive optical element.

In a second preferred embodiment, shown in cross section in FIG. 5, an optical storage device 60 includes a print layer 61 with a modified print layer region comprising a diffractive optical element (DOE) 63 on an upper print layer surface 67. The diffractive optical element 63, which may have a Fresnel or a geometrical grating microstructure for example, can be used to provide a unique visual effect when a user views through the outer optically-transparent region 45 of the optical storage device 60. The diffractive optical element 63 may extend over only a portion of the outer optically-transparent region 45, as shown, or along the entire circumference of the optical storage device 60 if desired. Alternatively, there may be provided a second diffractive optical element 65 extending partially or entirely over the inner optically-transparent region 43 of the reflective layer 31. As can be appreciated by one skilled in the relevant art, the diffractive optical elements 63 and 65 can be formed in the print layer 61 using methods similar to that in forming the lenticular region 23 in the print layer film 121 described above.

Figure 6:
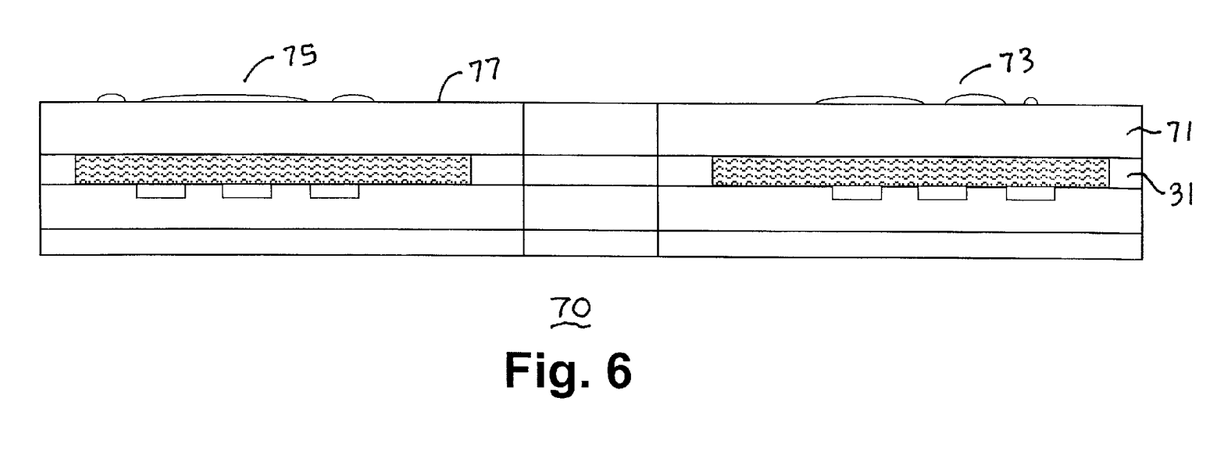
FIG. 6 is a cross-sectional view of a third embodiment of the optical storage device of FIG. 1 including an embossed section.

In a third preferred embodiment, shown in cross section in FIG. 6, an optical storage device 70 includes a print layer 71 with a modified print layer region comprising an embossed region 73 on an upper print layer surface 77. The embossed region 73 provides a tactile feature which serves to distinguish the configuration of the optical storage device 70 from a conventional CD or DVD. A second embossed region 75 may further be provided on the upper print layer surface 77, where the second embossed region 75 may be coextensive or separate from the embossed region 73. The embossed regions 73 and 75 may comprise raised lettering, graphics, or other shapes as desired to enhance the physical features of the optical storage device 70.

Figure 7:
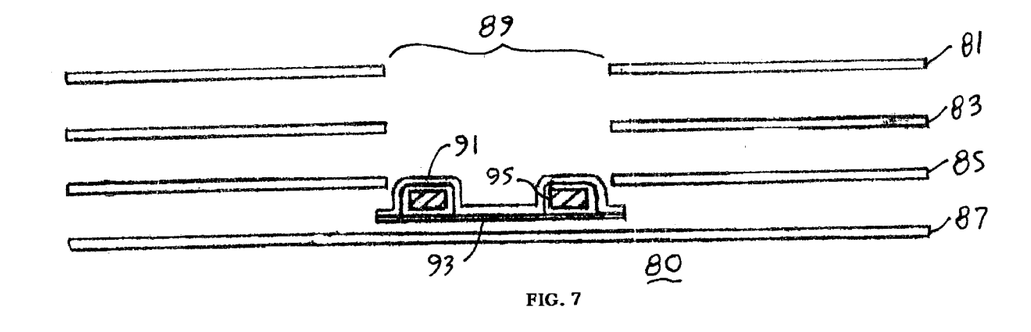
FIG. 7 is a cross-sectional view of a stack-up of a fourth embodiment of the optical storage device of FIG. 1 including an electronic article surveillance tag.
Figure 8:
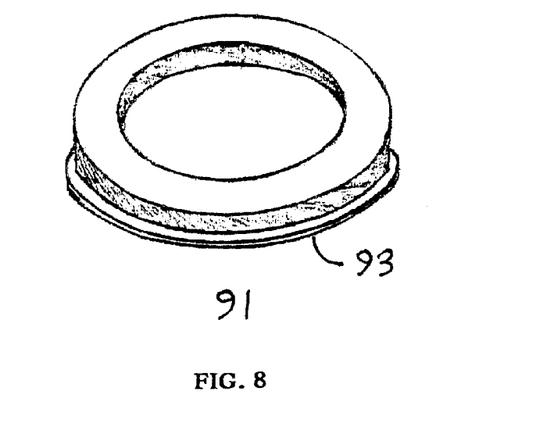
FIG. 8 is an isometric view of the electronic article surveillance tag of FIG. 7.

In a fourth preferred embodiment, shown in sectional view in FIG. 7, an optical storage substrate 80 is formed by laminating or bonding together a print layer 81, a reflective layer 83, and an optically-transparent substrate 85 to form an intermediate laminated combination film. Each of the print layer 81, the reflective layer 83, and the optically-transparent substrate 85 is approximately 0.012 inch in thickness. An opening 89 is die cut into the intermediate laminated combination film and an electronic article surveillance (EAS) tag 91, also shown in FIG. 8, is emplaced within the opening 89. It can be appreciated by one skilled in the art that, because a central projecting portion of the EAS tag 91 is smaller than the opening 89 and the outer periphery of the EAS tag 91 is larger than the opening 89, the EAS tag 91 is thereby retained in the opening 89.

Figure 9:
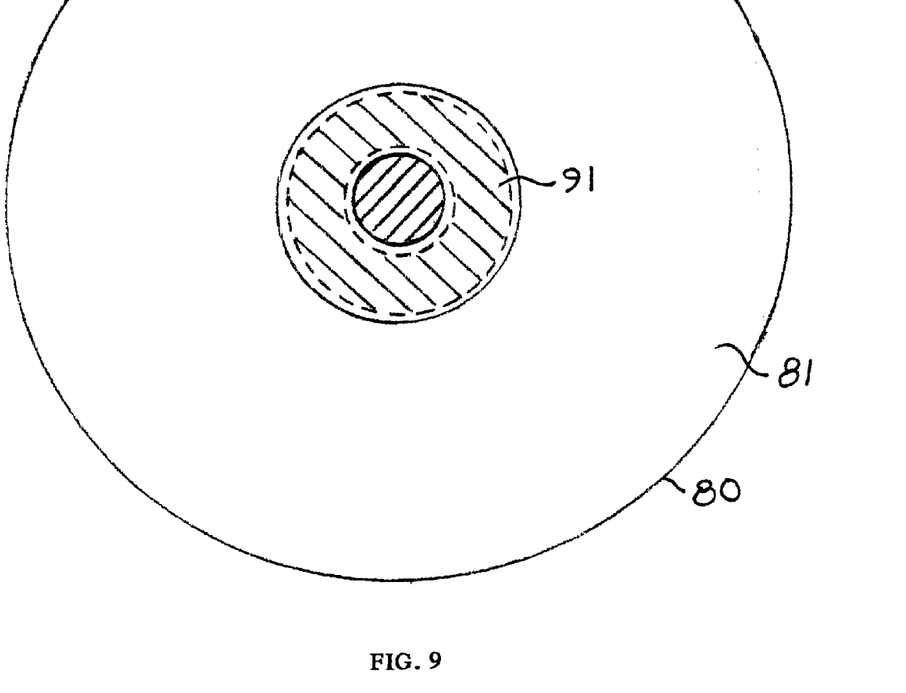
FIG. 9 is a planar view of the laminated stack-up of FIG. 7.

The EAS tag 91 includes an annular EAS detection element 95, such as a magnetostrictive ferromagnetic material. A protective layer 87 approximately 0.0012 inch in thickness is then laminated or bonded onto the intermediate combination film to form an optical storage substrate 80 having a total thickness of approximately 0.050 inch. An adhesive surface 93 serves to retain the EAS tag 91 in the opening 89 and against the protective layer 87. The optical storage substrate 80 is shown in planar view in FIG. 9. A subsequent die cut operation produces a perimeter 97 and an opening 99 in the optical storage substrate 80 to form an optical storage device 90 with the EAS tag 91.

Figure 10:
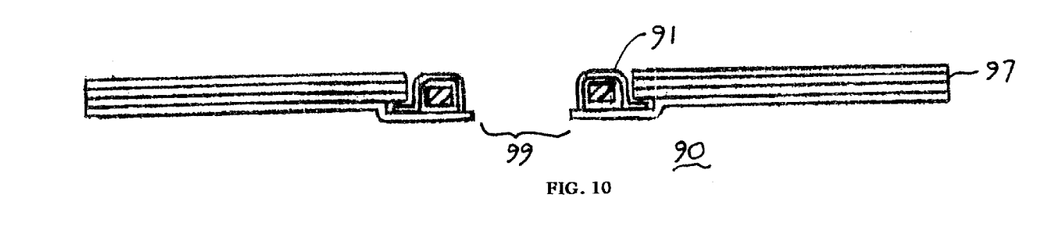
FIG. 10 is a cross-sectional view of an electronic storage device cut from the laminated stack-up of FIG. 9.
Figure 11:
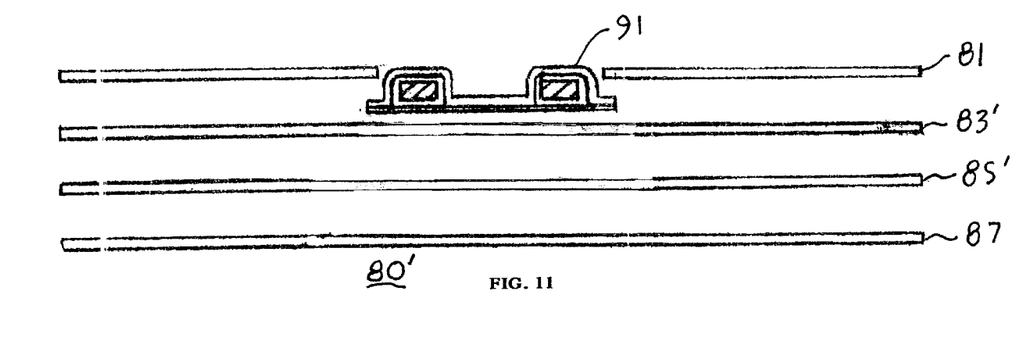
FIG. 11 is a cross-sectional view of a stack-up of an alternative embodiment of the optical storage device of FIG. 9.

Alternatively, the EAS tag 91 may be bonded to the print layer 81 to form a modified print layer region prior to lamination or bonding of the print layer 81, a reflective layer 83' and a flexible substrate 85', as shown in FIG. 11. In alternative optical storage substrate 80', the EAS tag is positioned between the print layer 81 and the reflective layer 83'. Accordingly, the thickness of the print layer 81 may be increased to provide for greater physical support and retention of the EAS tag 91 in the storage substrate 80'. Subsequently, the storage substrate 80' can be die cut to produce an optical storage disc similar to the optical storage device 90 of FIG. 10.

Figure 12:
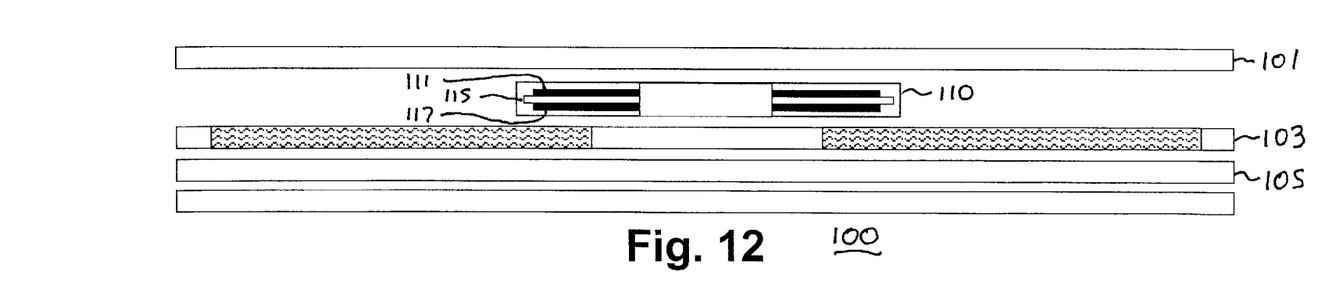
FIG. 12 is a cross-sectional view of a stack-up of a fifth embodiment of the optical storage device of FIG. 1 including a centric radio-frequency surveillance tag.
Figure 13:
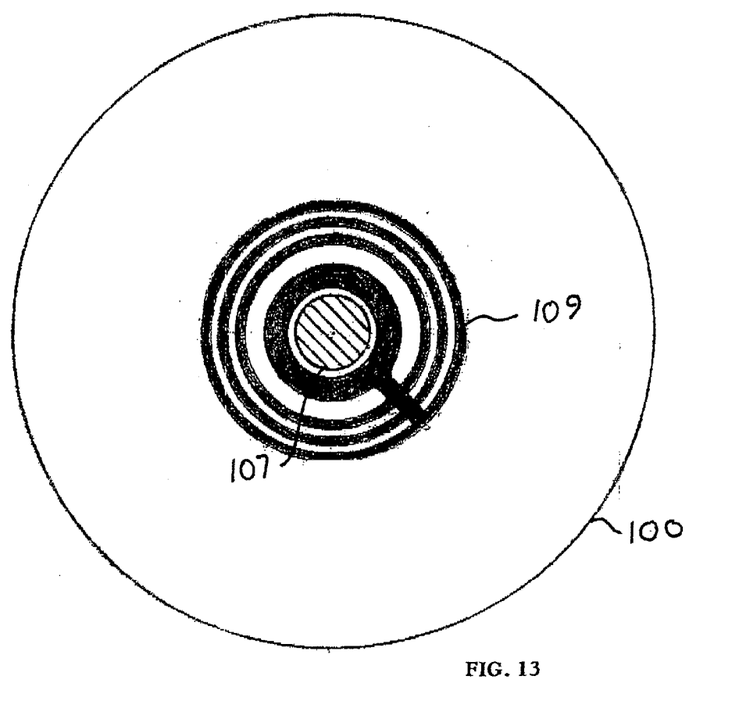
FIG. 13 is a planar view of the optical storage device of FIG. 12.

In a fifth preferred embodiment, shown in FIG. 12, an optical storage device 100 includes a centric conductive/dielectric structure forming a resonant circuit, such as a radio-frequency surveillance tag 110 placed between a print layer 101 and a reflective layer 103 prior to lamination or bonding to form the optical storage device 100. The radio-frequency surveillance tag 110 preferably includes conductive layers 111 and 113 separated by a dielectric layer 115, similar to a configuration disclosed in U.S. Pat. No. 5,510,770, "Surface deactivateable tag," issued to Rhoads. As shown in FIG. 13, the radio-frequency surveillance tag 110 is located at the center of the optical storage device 100 and includes a central portion 107. The central portion 107 is removed after a subsequent stamping or die-cutting operation to provide a center opening for the optical storage device 100, in accordance with the specified format for a CD or a DVD.

Figure 14:
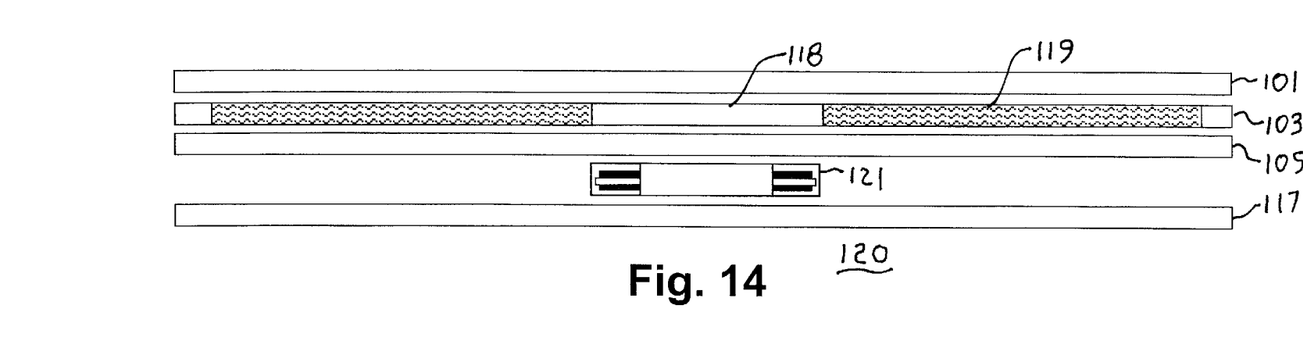
FIG. 14 is a cross-sectional view of an alternative embodiment of the optical storage device configuration of FIG. 12.

Alternatively, a small radio-frequency surveillance tag 121 can be emplaced between the flexible substrate 105 and a protective layer 117 in a stack-up of an alternative optical storage device 120, shown in FIG. 14. The outer diameter of the radio-frequency surveillance tag 121 is smaller than a central optically-transparent region 118 in a metallized region 119 of the reflective layer 103 and, accordingly, lies within the data region of the flexible substrate 105. Thus, emplacement of the radio-frequency surveillance tag 121 as shown does not prevent the reading of any data from the flexible substrate 105, or data layer. A subsequent stamping or die-cutting operation provides a center opening for the optical storage device 120, as described above.

Figure 15:
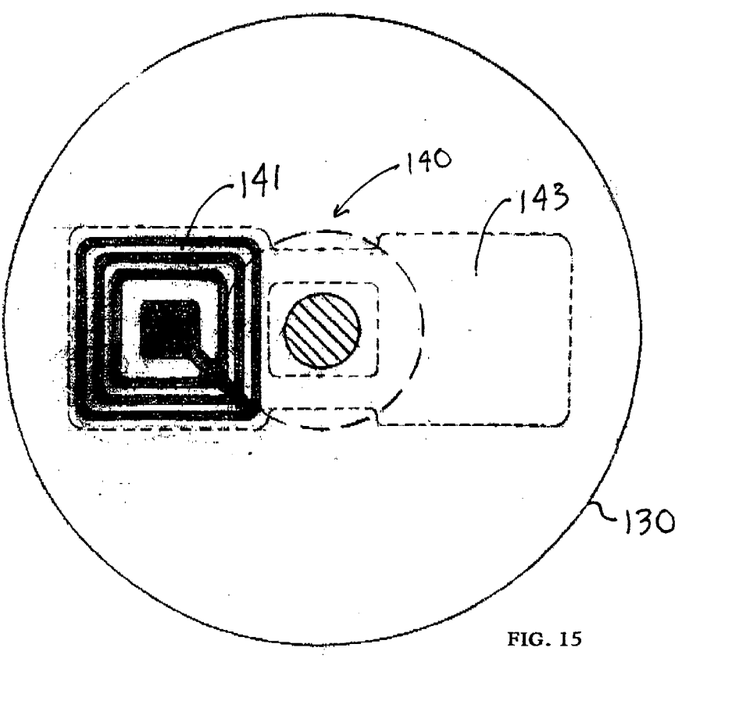
FIG. 15 is a planar view of an alternative embodiment of the optical storage device of FIG. 12 including a diametric radio-frequency surveillance tag.
Figure 16:
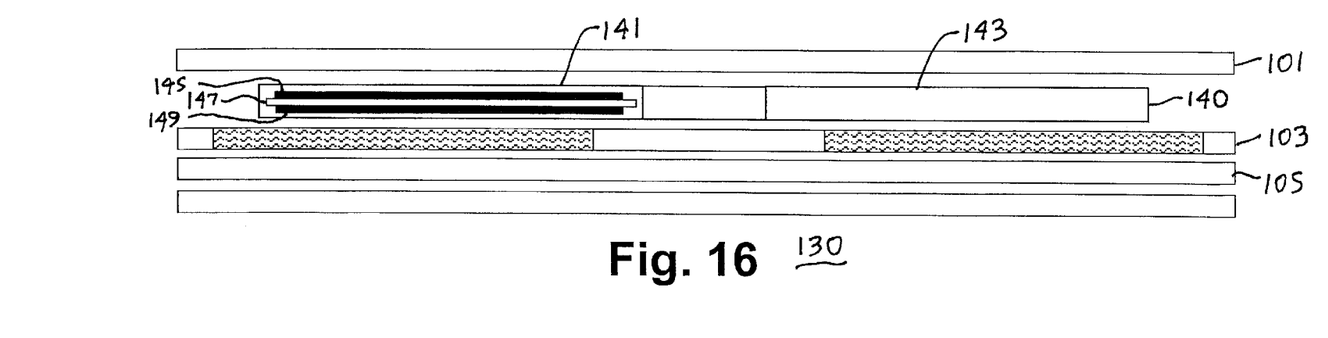
FIG. 16 is a cross-sectional view of the alternative embodiment of FIG. 15.

FIG. 15 shows a planar view of the alternative embodiment of FIG. 13. A diametric radio-frequency surveillance tag 140 is emplaced between the print layer 101 and the reflective layer 103 of an optical storage device 130. The radio-frequency surveillance tag 140 includes an active segment 141 and a passive segment 143 positioned across the diameter of the optical storage device 130 approximately as shown. The active segment 141 includes conductive layers 145 and 147 separated by a dielectric layer 149 to form a resonant circuit, as known in the relevant art. The passive segment 143 is provided as a mass to counter balance the active segment 141 during rotation of the optical storage device 130 when being read from or written to. Accordingly, the passive segment need not include a resonant circuit.

Figure 17:
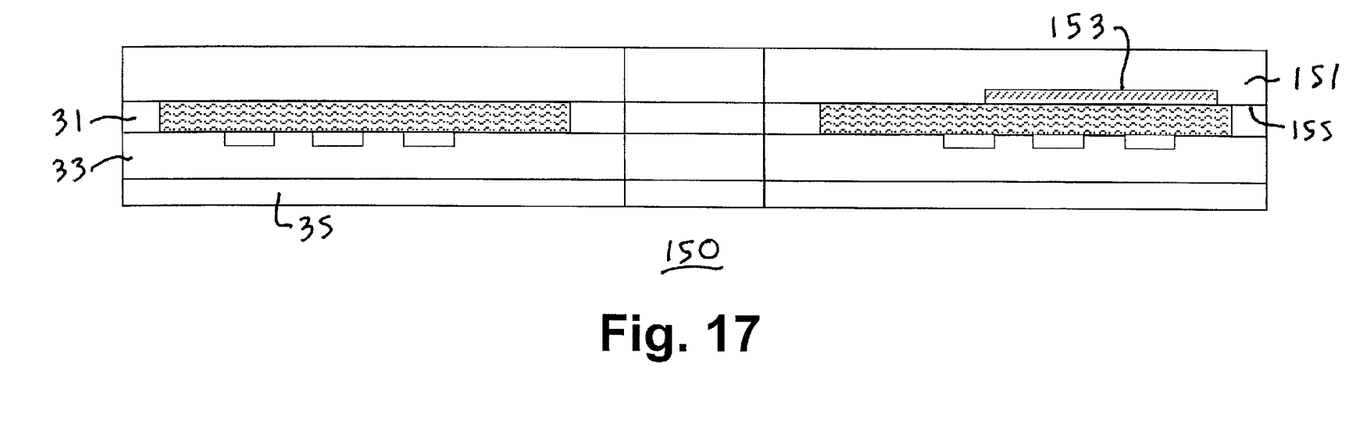
FIG. 17 is a cross sectional view of a sixth embodiment of the optical storage device of FIG. 1 including a holographic image.

In a sixth preferred embodiment, shown in cross section in FIG. 17, an optical storage device 150 includes a print layer 151 with a reflective holographic film 153 bonded to a print layer surface 155. The holographic film 153 can be formed by a conventional method, such as disclosed in U.S. Pat. No. 5,643,678, "Holographic film and method for forming," issued to Boswell. The print layer 151 is laminated with the reflective layer 31, the flexible substrate 33, and the optional protective layer 35 to form a multi-layer substrate which is die cut to form the optical storage device 150 using methods similar to those shown in FIGS. 3 and 4 above. Advantageously, the holographic film 153 can be used as a 'seal of authenticity' to assure the user that the optical storage device 150 is a genuine manufacturer's product and not an illegal copy or a counterfeit version.

Figure 18:
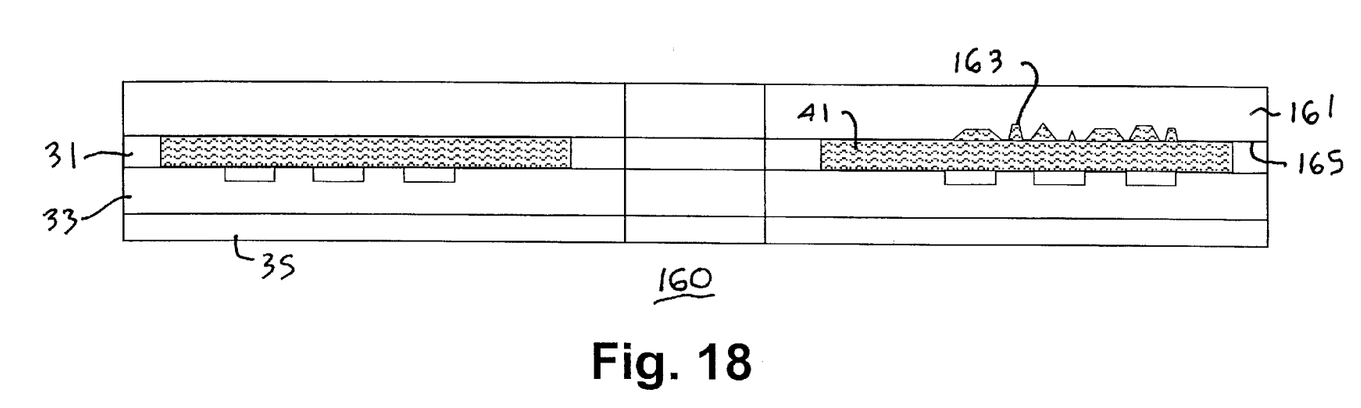
FIG. 18 is a cross sectional view of an alternative embodiment of the optical storage device of FIG. 17.

In an alternative sixth preferred embodiment of the optical storage device 150, shown in cross section in FIG. 18, an optical storage device 160 includes a print layer 161 with a holographic image 163 embossed into a print layer surface 165. The embossed holographic image 163 can be viewed against the metallized region 41 in the reflective layer 31. The print layer 161 is laminated with the reflective layer 31, the flexible substrate 33, and the optional protective layer 35 to form a multi-layer substrate from which the optical storage device 160 is die cut or otherwise fabricated.

While the invention has been described with reference to a preferred embodiment, it will be understood by those skilled in the relevant art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An optical storage device comprising:
   an optically-transparent flexible substrate having a first substrate surface;
   a reflective layer bonded to said first substrate surface; and
   a print layer having a first print layer surface bonded to said reflective layer, said print layer further having a second print layer surface with a modified print layer region.

2. The optical storage device of claim 1 wherein said modified print layer region comprises a least one of a lenticular region and a diffractive optical element.

3. The optical storage device of claim 2 further comprising an image disposed on said first print layer surface.

4. The optical storage device of claim 1 wherein said modified print layer region comprises an embossed region.

5. The optical storage device of claim 1 wherein said substrate comprises optically-readable data formed in said first substrate surface.

6. The optical storage device of claim 1 wherein said optical storage device is configured as a disc having a specified outer diameter and a centrally-located opening having a specified inner diameter.

7. The optical storage device of claim 1 wherein said reflective layer comprises a metallized region.

8. An optical storage device comprising:
   an optically-transparent flexible substrate having a first substrate surface;
   a reflective layer bonded to said first substrate surface; and
   a print layer having a first print layer surface bonded to said reflective layer, said first print layer surface including a modified print layer region.

9. The optical storage device of claim 8 wherein said modified print layer region comprises a holographic image.

10. The optical storage device of claim 8 wherein said holographic image comprises a holographic film disposed on said first print layer surface.

11. The optical storage device of claim 8 wherein said holographic image comprises an image embossed into said first print layer surface.

12. The optical storage device of claim 8 wherein said modified print layer region comprises an electronic article surveillance tag.

13. The optical storage device of claim 12 wherein said electronic article surveillance tag comprises a magnetostrictive ferromagnetic material.

14. The optical storage device of claim 12 wherein said electronic article surveillance tag comprises a radio frequency tag.

15. The optical storage device of claim 8 wherein said substrate comprises optically-readable data formed in said first substrate surface.

16. A method of fabricating an optical storage device, said method comprising the steps of:
    forming a print layer having a print layer surface with a modified print layer region;
    forming a reflective layer having a metallized region;
    forming an optically-transparent flexible substrate having optically-readable data in a substrate surface;
    bonding said print layer to said reflective layer and bonding said flexible substrate to said reflective layer to form a laminated combination film; and
    cutting a disc-shaped portion from said laminated combination film to form the optical storage device.

17. The method of claim 16 wherein said modified print layer region comprises a member of the group consisting of: a lenticular region, a diffractive optical element, an embossed region, a holographic image, and an electronic article surveillance tag.

18. A method of fabricating an optical storage device, said method comprising the steps of:
    laminating a print layer, a reflective layer, and a flexible substrate to form a laminated combination film;
    cutting an opening in said laminated combination film;
    emplacing an electronic article surveillance tag into said opening; and
    laminating a protective layer over said electronic article surveillance tag and onto said flexible substrate.

19. The method of claim 18 further comprising the step of cutting said laminated combination film to form a disc.

20. The method of claim 18 wherein said electronic article surveillance tag comprises a member of the group consisting of: magnetostrictive ferromagnetic material and a conductive/dielectric structure forming a resonant circuit.

* * * * *